United States Patent
Mazur et al.

(10) Patent No.: US 6,580,910 B1
(45) Date of Patent: Jun. 17, 2003

(54) METHOD AND SYSTEM FOR IMPROVING HANDOFFS IN CELLULAR MOBILE RADIO SYSTEMS

(75) Inventors: Sara Mazur, Bromma (SE); Bo Hagerman, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 08/994,586

(22) Filed: Dec. 19, 1997

(51) Int. Cl.[7] ............................................. H04Q 7/20
(52) U.S. Cl. ...................... 455/440; 455/439; 455/436
(58) Field of Search ................................. 455/436, 437, 455/438, 439, 440, 441, 442; 342/359, 350, 367–374; 370/331–334

(56) References Cited

U.S. PATENT DOCUMENTS

| | | | | |
|---|---|---|---|---|
| 4,475,010 A | * | 10/1984 | Huensch et al. | 370/334 |
| 4,881,082 A | | 11/1989 | Graziano | 342/432 |
| 5,327,575 A | * | 7/1994 | Menich et al. | 455/437 |
| 5,491,834 A | * | 2/1996 | Chia | 455/455 |
| 5,515,378 A | * | 5/1996 | Roy, III et al. | 370/334 |
| 5,566,355 A | * | 10/1996 | Kanai | 455/25 |
| 5,615,409 A | * | 3/1997 | Forssen et al. | 455/440 |
| 5,640,676 A | * | 6/1997 | Garncarz et al. | 455/436 |
| 5,848,358 A | * | 12/1998 | Forssen et al. | 455/437 |
| 5,893,033 A | * | 4/1999 | Keskitalo et al. | 455/437 |
| 5,913,168 A | * | 6/1999 | Moreau et al. | 455/441 |
| 5,945,948 A | * | 8/1999 | Buford et al. | 342/457 |
| 5,952,969 A | * | 9/1999 | Hagerman et al. | 342/457 |
| 6,038,444 A | * | 3/2000 | Schipper et al. | 455/421 |
| 6,128,486 A | * | 10/2000 | Keskitalo et al. | 455/422 |
| 6,148,211 A | * | 11/2000 | Reed et al. | 455/456 |
| 6,353,601 B1 | * | 3/2002 | Siira | 370/331 |

FOREIGN PATENT DOCUMENTS

| | | |
|---|---|---|
| EP | 0 639 035 A1 | 2/1995 |
| EP | 0 659 028 A2 | 6/1995 |
| WO | WO 95/12296 | 5/1995 |
| WO | WO 96/00484 | 1/1996 |
| WO | WO 96/38015 | 11/1996 |
| WO | WO 99/02005 | 1/1999 |

OTHER PUBLICATIONS

Standard Search Report for RS 100458 US completed on Sep. 11, 1998.

* cited by examiner

*Primary Examiner*—Duc Nguyen
(74) *Attorney, Agent, or Firm*—Jenkens & Gilchrist, P.C.

(57) ABSTRACT

A method and system are disclosed for making inter-cell handoffs to a cell of a base station including a directional antenna array. The handoff algorithm includes taking into account uplink direction of arrival measurements in at least one candidate target base station, made on signals from the mobile radio terminal to it's serving base station, and directly after handoff using a directional narrow lobe from the antenna array. The narrow lobe can be used immediately after the handoff in the radio base stations that have antenna arrays, by including the direction (of arrival information) to the mobile radio terminal in the handoff order to the target base station. Also disclosed are a method and system for measuring uplink interference on idle narrow lobe traffic channels, and using this information when selecting at handoff a target base station and traffic channel.

12 Claims, 2 Drawing Sheets

METHOD AND SYSTEM FOR IMPROVING HANDOFFS IN CELLULAR MOBILE RADIO SYSTEMS

BACKGROUND OF THE INVENTION

1. Technical Field of the Invention

The present invention relates in general to the mobile radio communications field and, in particular, to a method and system for improving handoffs of mobile radio terminals between radio base stations.

2. Description of Related Art

In cellular mobile radio systems, the mobile radio terminals (mobile stations or MSs) are allowed to move from one cell to another. Consequently, there is a need to be able to handoff these MSs from the radio base station (BS) of the one cell to the radio BS of the other cell (inter-cell handoff). When a handoff of a MS is to be performed from a serving BS to a target BS, the target BS selection is typically made based on the following three criteria (in descending order of importance): (1) information about the expected increased quality of the connection being considered after the handoff ("own interest" aspect); (2) information about the expected decreased quality of other connections ("courtesy" aspect); and (3) information about the traffic load in the target BSs being considered ("availability" aspect).

In this regard, (directional) antenna arrays or "smart antennas" have been introduced into the radio BSs of cellular mobile radio systems, in order to direct narrow transmitting and receiving beams (lobes) from the BSs more precisely toward the MSs being served. The use of these directional narrow beam antennas improves the carrier-to-interference ratio (C/I) in the cellular system, and also increases the system's traffic handling capacity. As such, a need has arisen to provide an effective handoff technique that takes advantage of the benefits afforded to cellular systems including radio BSs with directional antenna arrays.

PCT Application No. PCT/SE95/00764 (WO 96/00484) discloses an intra-cell (within a cell) handoff method based on the use of spatial information measured with an antenna array. Swedish Patent Application No. 9702597-7 (P08214) discloses an intra-cell handoff method used in a radio BS including an array antenna. With these approaches, information about the Direction-of-Arrival (DOA) information used for transmissions from the BS before the handoff occurs, is made available by the serving transmitter-receiver to the target transmitter-receiver for use after the handoff occurs. However, a common drawback of these conventional approaches is that they both deal specifically with intra-cell handoffs. Consequently, an improved method is needed for handling inter-cell handoffs when antenna arrays or "smart antennas" are being used.

SUMMARY OF THE INVENTION

The use of array antennas in cellular network radio BSs creates a need during handoffs to select an optimal target radio BS from among a plurality of radio BSs. These radio BSs can utilize omni-directional-antennas, sectored antennas, and array antennas. There is also a concomitant need to be able to select a traffic channel in the target BS.

As such, a problem addressed by the present invention is how to provide measurements for use by a handoff algorithm when a system includes BSs with array antennas. Another problem addressed by the present invention is how to use narrow beams in a target BS immediately after an inter-cell handoff occurs.

It is, therefore, an object of the present invention to provide a method and system for determining well in advance of an inter-cell handoff, the path loss and direction of a narrow beam that will be used for communications after the inter-cell handoff occurs, wherein a target BS for the handoff of a MS is selected from among at least two candidate target BSs, and at least one of candidate target BSs has an array antenna. The resulting measurement information derived can be used in a handoff algorithm to select the target BS and the traffic channel to be used.

It is another object of the present invention to provide a method and system for determining well in advance of an inter-cell handoff, the path loss and direction of a narrow beam that will be used for communications after the inter-cell handoff occurs, wherein the target BS for a handoff of a MS is selected from among at least two candidate target BSs, at least one of the candidate target BSs has an array antenna, and also for determining well in advance (but with a relatively simple technique) the quality of a connection to be expected on a narrow lobe traffic channel in the target BS having the array antenna. The resulting supplementary measurement information can be used in a handoff algorithm to select the target BS and the traffic channel to be used. (Note: Path loss is equal to transmitted signal strength minus received signal strength. Since the MS's transmitted signal strength is known to the system, the term "path loss" is not referred to hereinafter and instead in the BS received signal strength is used.)

It is still another object of the present invention to provide a method and system that enables the use of a narrow beam traffic channel in the target BS immediately after an inter-cell handoff has occurred.

The foregoing and other objects are achieved by a method and system for improved inter-cell handoffs, wherein at least one target BS including an array antenna is equipped with a Modified Receiver Module (ModRX). The ModRX is ordered to perform measurements on a MS served by a neighbor BS. The measurements include at least DOA information and uplink received signal strength (SS-ur) information. The ModRX reports the measurement information to the network controller, which can decide to handoff the MS to a specific traffic channel in a target BS based in part on the measurement information reported by the ModRX.

In one embodiment of the present invention, the DOA and SS-ur measurement information are supplemented by quality measurements made in the ModRX of the target BSs with respect to one or more idle (candidate BSs') traffic channels having the same DOA as the measured DOA of the MS to be handed off (e.g., a common lobe). For example, these quality measurements preferably comprise the uplink received signal strength of the interference (SS-ur-i) in the idle candidate BSs' traffic channels. The SS-ur from the MS, and the SS-ur-i of the idle candidate(s) are then used together with the known uplink transmitted signal strength (SS-ut) of the MS as an input to the handoff algorithm to be used for selecting a target BS and traffic channel.

In a second embodiment of the present invention, the DOA measured and reported by the ModRX is used by the network controller after a handoff decision has been made, to order the target BS to transmit in the direction (from the DOA information) reported by the ModRX.

An important technical advantage of the present invention is that by reporting the DOA information about the MS to be handed off, and the interference of the possible narrow lobe target traffic channels in the same DOA, the network controller can use a simple handoff algorithm to choose between narrow lobe and wide lobe traffic channel alternatives for all types of BSs using comparable criteria, such as, for example, the C/I.

Another important technical advantage of the present invention is that the handoff method that can be used allows the use of a narrow lobe immediately after the handoff, rather than the conventional approach that first uses a wide lobe in the target BS, finds the (new) DOA in the target BS, and then uses a narrow lobe.

Still another important technical advantage of the present invention is that the handoff method used identifies the best narrow lobe DOA information from the MS to be handed off to the target BS, even if a reflected beam is the best beam to use.

Yet another important technical advantage of the present invention is that certain popular mobile communications systems, such as, for example, the Ericsson CMS 88 mobile communications system includes modules in the BSs that are capable of measuring SS-ur while performing a "verification" before handoff (i.e., checking SS-ur in the target BS). As such, the specialized ModRX can be a modification of an existing measurement module that, for example, adds a DOA measurement device to an existing measurement module. Consequently, the procedures and signal protocols necessary to perform the DOA and other measurements are already available in the existing module.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–4 of the drawings, like numerals being used for like and corresponding parts of the various drawings.

Essentially, the present invention provides an intercell handoff method that is based on a verification procedure developed by Ericsson, which can be applied in conjunction with handoffs for the IS-54, IS-136 and Pacific Digital Cellular (PDC) standards. As such, in Ericsson mobile communication systems, when a handoff request is sent to a mobile services switching center (MSC), the MSC selects a target cell and orders a module in the target cell's BS to perform a verification procedure. In the Ericsson systems, such a module is called a Location and Verification Module (LVM) under the IS-136 standard, and a Verification Receiver (VRX) in the PDC standard. The primary purpose of this verification function is to verify the presence of the MS in the target cell. The verification module tunes to and verifies the MS's presence on the old channel (prior to handoff). The verification results are then sent to the MSC.

In accordance with the present invention, the verifying "uplink" measurements carried out by a candidate target BS (candidate to receive the MS being handed off) include DOA measurements in addition to the usual SS measurements. These SS and DOA measurements are reported to the MSC by at least two candidate target BSs, in order to enable the MSC to select an optimal target BS and traffic channel. The DOA information is also used immediately after the handoff for facilitating transmission of a directional downlink narrow lobe. The selection of a narrow lobe traffic channel can be based on DOA information only. Alternatively, the selection of a narrow lobe traffic channel can be based on both DOA information and uplink measurements of quality (e.g., disturbance "I") made on idle traffic channels in the candidate target BSs using a narrow uplink beam in the DOA that has been determined for the MS. This information can be obtained by measurements performed before handoff (e.g., event-driven), or performed and collected on a regular basis (periodically).

Figure 1:
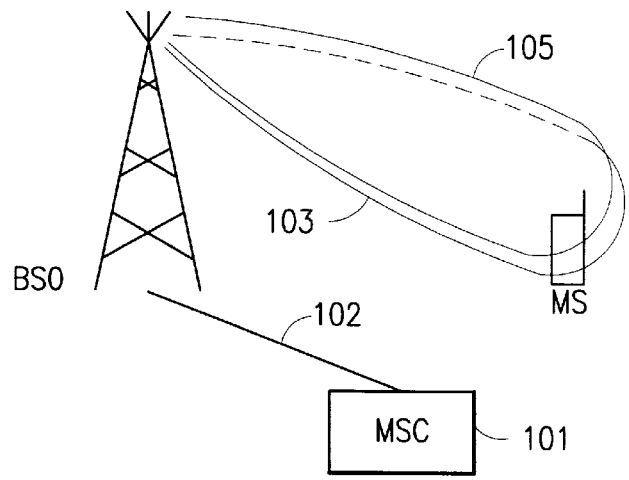
FIG. 1 is a schematic diagram that illustrates a conventional intra-cell handoff wherein the DOA information is immediately reused by the new traffic channel.

FIG. 1 is a schematic diagram that illustrates a conventional intra-cell handoff approach, wherein the DOA information is immediately reused by the new traffic channel. A radio base station BS0 is connected to an MSC 101 via a wireline connection 102. The radio base station BS0 includes an array antenna and a plurality of transceiver modules (TRXs) (not explicitly shown). A mobile radio terminal (MS) is handed off by an intra-cell handoff procedure from one TRX to another TRX in the same radio base station BS0. The radio base station BS0 transmission is indicated in FIG. 1 by the narrow lobes 103 and 105, which both have the same DOA. The DOA information is made available from one TRX to the other, by storing and updating the information in a memory location in the radio base station BS0.

Figure 2:
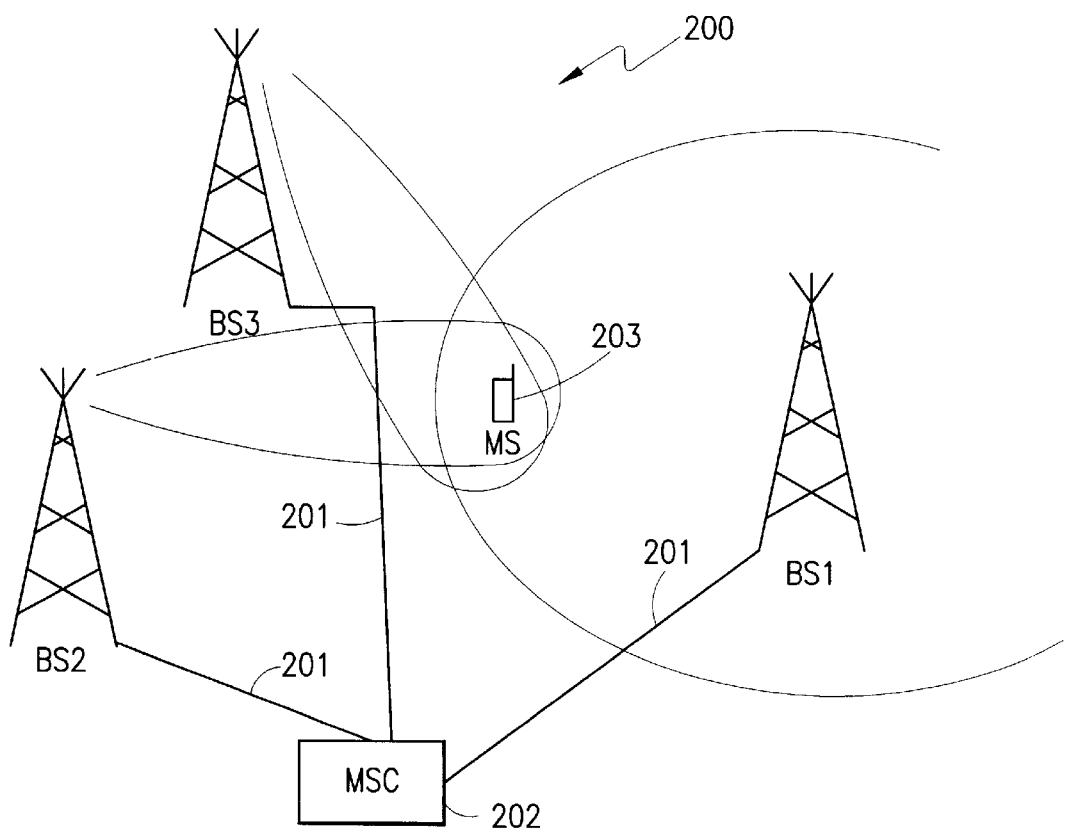
FIG. 2 is a schematic diagram of an exemplary mobile radio system that can be used to illustrate an inter-cell handoff, in accordance with a preferred embodiment of the present invention.

FIG. 2 is a schematic diagram of an exemplary mobile radio system 200 that can be used to illustrate an inter-cell handoff, in accordance with a preferred embodiment of the present invention. The mobile radio system 200 includes a plurality of radio base stations. Although three such radio base stations (e.g., BS1, BS2 and BS3) are shown, more than three such radio base stations (e.g., BS1 . . . BSn) can be included in system 200. The radio base stations shown are connected to a wire-bound network via communication links 201. The wire-bound network can include, for example, an MSC 202. In this embodiment, a mobile radio terminal MS 203 is shown being handed off from radio base station BS1 to one of the other radio base stations BS2 or BS3.

Figure 3:
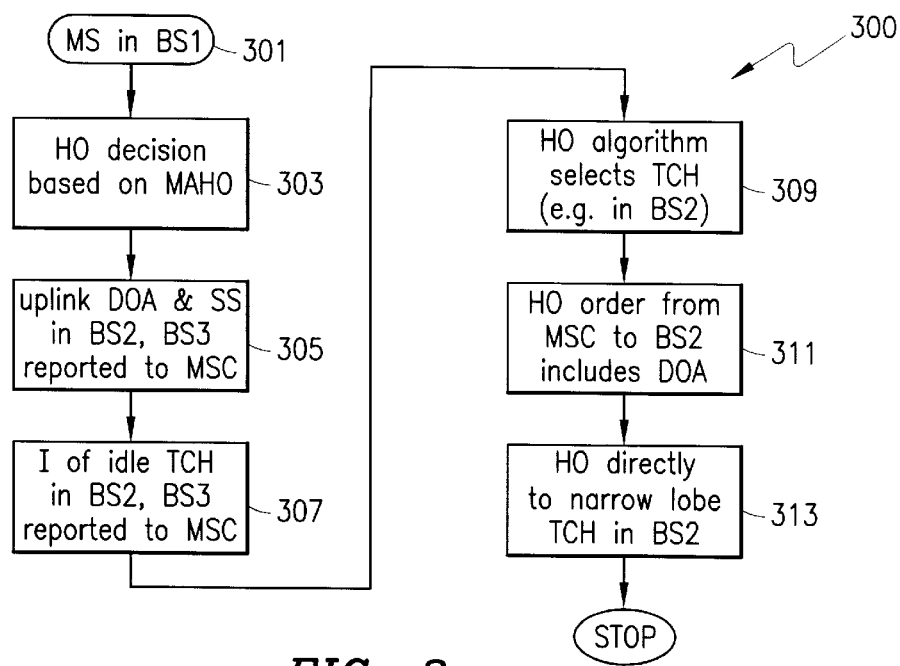
FIG. 3 is a flow diagram of an exemplary inter-cell handoff method that can be used to implement the preferred embodiment of the present invention as shown in FIG. 2.

FIG. 3 is a flow diagram of an exemplary inter-cell handoff method that can be used to implement the preferred embodiment of the present invention in the mobile radio system 200 shown in FIG. 2. At step 301, the mobile radio terminal MS 203 is located at the periphery of a cell served by radio base station BS1. For this embodiment, radio base station BS1 includes an omni-directional antenna. At this point in time, assume that the mobile radio terminal MS 203 has already performed downlink measurements of signals received from neighboring base stations, and reported the results to the MSC 202 by following a procedure commonly referred to as a Mobile Assisted Handoff (MAHO).

At step 303, the MSC 202 decides (based on certain criteria including the MAHO measurement results) that it is desirable to handoff the mobile radio terminal MS 203 to one of the plurality of radio base stations BSn (e.g., BS2 or BS3).

At step 305, the MSC 202 orders the radio base stations BS2 and BS3 to report their respective SS and DOA information as measured on the uplink signals transmitted from the mobile radio terminal MS 203 on its traffic channel to its serving radio base station BS1. Preferably, the parameters of the traffic channel (e.g., frequency, time slot) are indicated in the order message. These measurements can be made in the radio base stations BS2, BS3 by determining their respective DOAs using a conventional approach, measuring the respective uplink received signal strengths (SS-ur), and then reporting the respective DOA and SS-ur information to the MSC 202.

At step 307, the interference (I) (i.e., the received signal strength SS-ur-i received on idle traffic channels) is also reported to the MSC 202. The retrieval of this information can be either event-driven when a handoff is imminent, or periodically reported to the MSC 202 for all channels and/or DOAs.

At step 309, the handoff algorithm being executed in the MSC 202 selects a target radio base station (e.g., BS2 or BS3) and a traffic channel (TCH) to be used for the handoff. This selection is based on the reported information, including at least the DOA, SS-ur, and SS-ur-i for one candidate traffic channel.

At step 311, the MSC 202 sends a handoff order to the selected radio base station (e.g., BS2). The handoff order message includes the DOA information for that radio base station, or alternatively, a reference to the DOA previously reported (which can be stored for a predetermined time in the radio base station BS2).

At step 313, the handoff order is executed, which includes directing a narrow beam TCH downlink towards the handed off mobile radio terminal MS 203, in the direction specified by the DOA information in the handoff order.

Figure 4:
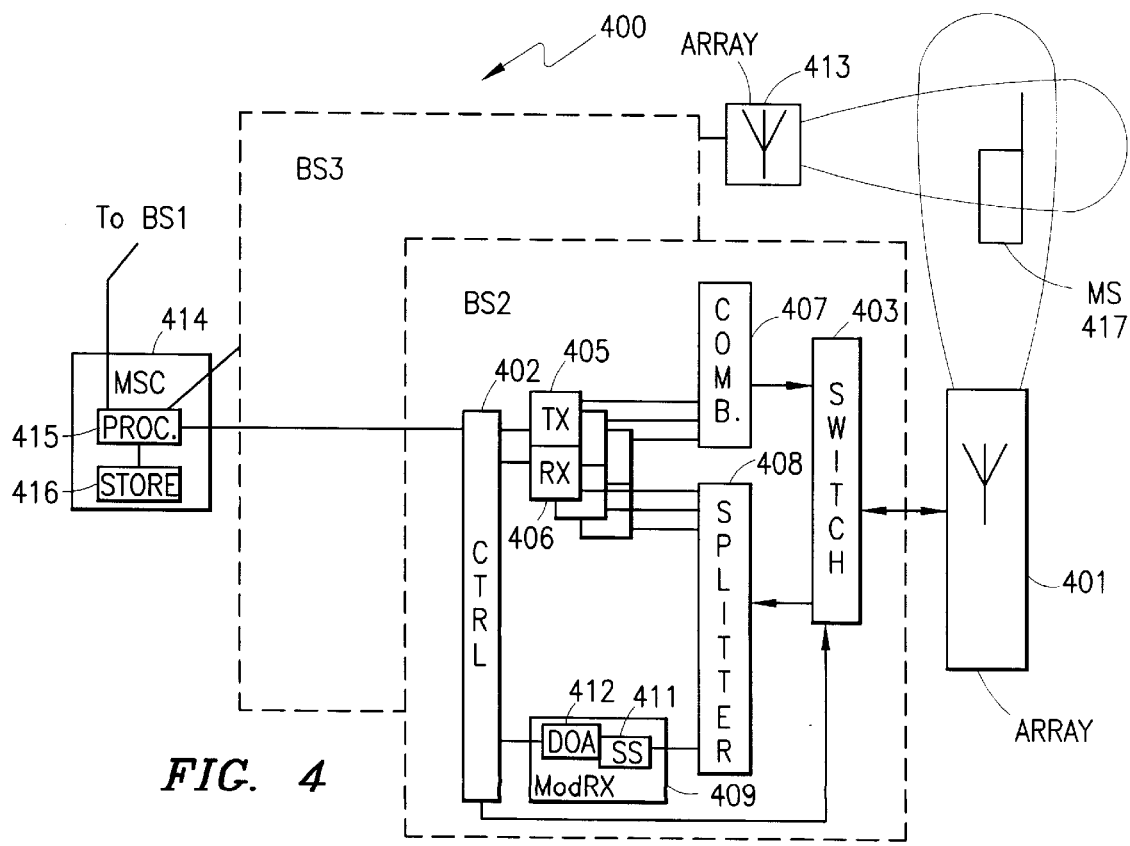
FIG. 4 is a schematic diagram of the details for the exemplary mobile radio system shown in FIG. 2.

FIG. 4 is a schematic diagram that illustrates the details of the exemplary mobile radio system 200 shown in FIG. 2. Radio base station BS2 (or BS2 . . . BSn) includes an antenna array 401, which is operable to spatially direct wide and narrow transmitting and receiving lobes. The control of these antenna operations is specified by the control unit 402, which sends switching commands to the antenna switch 403. Radio base station BS2 also includes transmitters TX 405 and receivers RX 406 connected to the antenna switch 403 via a combiner 407 and splitter 408. In accordance with the present invention, a specialized receiver module ModRX 409 performs the uplink SS measurements in an SS measurement device 411, and DOA measurements in a DOA measurement device 412. The SS and DOA measurements are performed using a known approach under the control of the control unit 402, which controls the antenna switch 403 and ModRX 409 along with the SS measurement device 411 and DOA measurement device 412. A second radio base station BS3 is also shown with an antenna array 413. Radio base station BS3 functions and is structured similar to radio base station BS2.

A connection is shown between radio base station BS1 and an MSC 414. The MSC 414 includes a processor 415 and a memory store 416, which can be used to execute the handoff algorithm and provide the appropriate handoff orders to the radio base stations and mobile radio terminal MS 417. In this exemplary embodiment, MS 417 is being handed off from BS1 to BS2.

For a different embodiment (also referring to FIG. 4), an alternative to using a specialized receiver ModRX for SS and DOA measurements, is to equip at least some of the receivers RX 406 with SS and DOA measurement capabilities, and enable those receivers to tune to frequencies not assigned for traffic with their respective radio base stations (e.g., in this case BS2) in order to make the appropriate measurements.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for performing an inter-cell handoff in a mobile communications system, comprising the steps of:

actively measuring and determining in at least one candidate target base station signal, each in a separate cell, signal strength parameter and direction of arrival parameter from an uplink signal transmitted by a mobile terminal to a serving radio base station in a first cell;

reporting said measured and determined signal strength parameter and direction of arrival parameter to a network controller associated with both the at least one candidate target base station and the serving radio base station;

said network controller selecting a target base station in a second cell from at least two candidate target base stations, said at least two candidate target base stations including said at least one candidate target base station, using said measured and determined signal strength parameter and direction of arrival parameter; and ordering said selected target base station in the second cell to complete said inter-cell handoff of said mobile terminal by directing a narrow lobe traffic channel to the mobile terminal based on a direction specified by the direction of arrival parameter.

2. The method of claim 1, wherein the actively measuring step further comprises the step of actively measuring interference signal strength on an idle narrow lobe candidate traffic channel in a direction indicated by said measured and determined direction of arrival parameter.

3. A method for performing an inter-cell handoff in a mobile communications system, comprising the steps of:

actively measuring and determining in at least one candidate target base station, each in a separate cell, signal strength and direction of arrival parameters from an uplink signal transmitted by a mobile terminal to a serving radio base station in a first cell;

reporting said measured and determined signal strength and direction of arrival parameters to a mobile switching center;

said mobile switching center selecting a target base station in a second cell from at least two candidate target base stations, said at least two candidate target base stations including said at least one candidate target base station, using said measured and determined parameters;

ordering said selected target base station in the second cell to complete said inter-cell handoff of said mobile terminal; and wherein the ordering step further comprises the steps of:
including said measured and determined direction of arrival parameter in an order message to said selected target base station in the second cell; and responsive to said order message, said selected target base station in the second cell transmitting immediately after said handoff a narrow lobe traffic channel in a direction associated with said measured and determined direction of arrival parameter.

4. A method for performing an inter-cell handoff in a mobile communications system, comprising the steps of:

actively measuring and determining in at least one candidate target base station, each in a separate cell, signal strength and direction of arrival parameters from an uplink signal transmitted by a mobile terminal to a serving radio base station;

reporting said measured and determined signal strength and direction of arrival parameters to a network controller associated with both the at least one candidate target base station and the serving radio base station;

said network controller selecting a target base station in a second cell from at least two candidate target base stations, said at least two candidate target base stations including said at least one candidate target base station, using said measured and determined parameters;

ordering said selected target base station in a second cell to complete said inter-cell handoff of said mobile terminal; and wherein the ordering step further comprises the steps of:
including a reference associated with said measured and determined direction of arrival parameter in an order message to said selected target base station in the second cell; and responsive to said order message, said selected target base station in the second cell retrieving said measured and determined direction of arrival parameter and transmitting a narrow lobe traffic channel in a direction associated with said measured and determined direction of arrival parameter.

5. A method for performing an inter-cell handoff in a mobile communication system, comprising the steps of:

actively measuring and determining in at least one candidate target base station, associated with a second cell, signal strength parameter and direction of arrival parameter from an uplink signal transmitted by a mobile terminal to a serving radio base station in a first cell;

reporting said signal strength parameter and direction of arrival parameter to a network controller associated with both the at least one candidate target base station and the serving radio base station;

determining if said reported signal strength parameter is greater than or equal to a threshold value;

selecting a narrow lobe traffic channel for transmission using said measured and determined parameters;

if said reported signal strength parameter is greater than or equal to said threshold value, ordering said candidate target base station associated with the second cell to complete said inter-cell handoff of said mobile terminal to said narrow lobe traffic channel with a direction associated with said direction of arrival parameter.

6. A method for performing an inter-cell handoff in a mobile communication system, comprising the steps of:

actively measuring and determining in at least one candidate target base station signal, each in a separate cell, strength and direction of arrival parameters from an uplink signal transmitted by a mobile terminal to a serving radio base station in a first cell;

reporting said measured and determined parameters to a network controller associated with both the at least one candidate target base station and the serving radio base station;

said network controller selecting a narrow lobe traffic channel from among a plurality of idle traffic channels using said reported measured and determined parameters; and ordering a selected target base station in a second cell to complete said inter-cell handoff using the selected narrow lobe traffic channel in a direction determined from the actively measuring step.

7. The method of claim 6, wherein the actively measuring step further comprises the step of:

actively measuring in said at least one candidate target base station an interference signal strength parameter from at least one uplink interference signal in said direction of arrival, on a narrow lobe on an idle traffic channel.

8. A system for performing an inter-cell handoff in a mobile communications system, comprising:

at least one candidate target base station, each in a separate cell, said at least one candidate target base station including a measurement unit for actively measuring and determining signal strength parameters and direction of arrival parameters from an uplink signal transmitted by a mobile terminal to a serving radio base station in a second cell;

a network controller associated with both the at least one candidate target base station and the serving radio base station;

means for reporting said measured and determined signal strength parameters and said direction of arrival parameters to said network controller, said network controller selecting a candidate target base station in a second cell using said reported measured and determined signal strength parameters and said direction of arrival parameters; and wherein said network controller includes means for ordering said selected candidate target base station in the second cell to complete said handoff of said mobile terminal by directing a narrow beam TCH inter-cell downlink to the mobile terminal based in a direction specified by the direction of arrival parameters.

9. The system of claim 8, wherein said measurement unit comprises a modified receiver module.

10. The system of claim 8, wherein said means for ordering comprises means for ordering said selected candidate target base station to complete said handoff of said mobile terminal using a narrow lobe with a direction associated with said reported measured and determined direction of arrival parameter.

11. A non-serving radio base station in a first cell, comprising:

a directional antenna;

means for actively measuring and determining a direction of arrival parameter and an uplink received signal strength parameter associated with a signal transmitted from a radio terminal to a serving radio base station in a second cell;

means for reporting to a network controller associated with both the at least one candidate target base station and the serving radio base station said measured and determined direction of arrival parameter and said measured and determined uplink received signal strength parameter; and means for receiving from said network controller an order to complete an inter-cell handoff of said radio terminal from said serving radio base station to the non-serving radio base station by directing a narrow beam TCH downlink to the mobile terminal based in a direction specified by the direction of arrival parameter.

12. The non-serving radio base station of claim 11, further comprising means means for measuring a quality of at least one idle traffic channel including a narrow lobe in said measured and determined direction of arrival; and wherein said means for reporting to said network controller said measured and determined direction of arrival and said measured and determined uplink received signal strength comprises means for reporting said measured quality.

* * * * *